(12) United States Patent
Dunseath et al.

(10) Patent No.: US 11,480,293 B2
(45) Date of Patent: Oct. 25, 2022

(54) ADJUSTABLE OVERHEAD MOUNTABLE STORAGE SYSTEM

(71) Applicant: Dwayne Dunseath, Las Vegas, NV (US)

(72) Inventors: Dwayne Dunseath, Las Vegas, NV (US); Dylan Dunseath, Scottsdale, AZ (US); Gary Romig, Collegeville, PA (US)

(73) Assignee: Dwayne Dunseath, Las Vegas, NV (US)

( * ) Notice: Subject to any disclaimer, the term of this patent is extended or adjusted under 35 U.S.C. 154(b) by 241 days.

(21) Appl. No.: 16/747,295

(22) Filed: Jan. 20, 2020

(65) Prior Publication Data
US 2021/0222828 A1 Jul. 22, 2021

(51) Int. Cl.
*F16M 13/02* (2006.01)
*A47B 51/00* (2006.01)
*A47B 45/00* (2006.01)
*A47B 96/14* (2006.01)

(52) U.S. Cl.
CPC .......... *F16M 13/027* (2013.01); *A47B 45/00* (2013.01); *A47B 51/00* (2013.01); *A47B 96/14* (2013.01); *A47B 2051/005* (2013.01); *A47B 2230/0003* (2013.01)

(58) Field of Classification Search
CPC ...... F16M 13/027; A47B 45/00; A47B 51/00; A47B 96/14; A47B 2051/005; A47B 2230/0003
See application file for complete search history.

(56) References Cited

U.S. PATENT DOCUMENTS

| | | | |
|---|---|---|---|
| 5,271,586 A * | 12/1993 | Schmidt | F16B 37/046 248/58 |
| 5,372,341 A * | 12/1994 | Witherbee | H02G 3/263 248/49 |
| 5,704,571 A * | 1/1998 | Vargo | H02G 3/0456 248/58 |
| 5,769,365 A * | 6/1998 | Onishi | F16L 3/2431 248/49 |
| 6,354,542 B1 * | 3/2002 | Meyer | F16L 3/243 248/58 |
| 6,483,025 B1 * | 11/2002 | Samsi | H02G 3/0456 174/480 |
| 7,316,380 B2 * | 1/2008 | Arakawa | A47F 5/0006 24/136 A |
| 8,899,544 B2 * | 12/2014 | Meredith, Jr. | H02G 3/263 248/500 |
| 10,309,554 B2 * | 6/2019 | Shelton | H02G 3/263 |
| 10,451,198 B2 * | 10/2019 | Lupsa | F16L 3/26 |

* cited by examiner

*Primary Examiner* — Ko H Chan
(74) *Attorney, Agent, or Firm* — Bayramoglu Law Offices LLC

(57) ABSTRACT

A storage system including at least two support rails attached to a ceiling or other overhead structure and at least two channel rails which are configured to be moveably attached to the support rails in a spaced relationship with sliding fastening clips. The channel rails move along the length of the support rail in order to accommodate the different widths of storage containers which are to be installed in the storage system.

19 Claims, 17 Drawing Sheets

ADJUSTABLE OVERHEAD MOUNTABLE STORAGE SYSTEM

TECHNICAL FIELD

The present disclosure relates to an overhead storage system. More specifically, the present disclosure relates to an adjustable overhead mountable storage system configured to be mounted on a ceiling or other overhead structure and configured to receive, store and support storage containers.

BACKGROUND

In most homes, offices, garages and workplaces, storage space is limited and is highly desirable. For example, floors of garages have a limited amount of storage space and even less storage space when a vehicle is parked thereon. Being able to fully utilize the storage space within a garage of a home or of a workplace is very important. Therefore, making effective use of the ceiling of a garage or some other structure to storage items is an extremely efficient and inexpensive solution of storing items within a limited storage space. Since vehicles parked within a garage take up much of the floor storage space, having a storage system or apparatus mounted to the garage ceiling can provide ample storage space within the garage or some other structure. Therefore, the present invention discloses an adjustable overhead storage system which can be mounted on a ceiling or other overhead structure and can receive, store and support storage containers.

SUMMARY

An object of the present invention is to provide a solution of storage within a space of a structure by having an adjustable overhead mountable storage system configured to be mounted on a ceiling or other overhead structure and configured to receive, store and support storage containers.

An embodiment of the present invention provides a system including at least two support rails attached to a ceiling or other overhead structure and at least two channel rails which are configured to be moveable and moveably attached to the at least two support rails in a spaced relationship. The spaced relationship of the at least two channel rails provides the solution of being able to move one or all of the channel rails in order to accommodate the different shapes, widths and sizes of the storage containers and the storage containers' lids and/or handles. The at least two channel rails are in the general form of an I-beam. The storage system is installed on a ceiling or other overhead structure.

The support rails are installed along or across ceiling joists. However, the support rails can be installed on other surfaces other than ceiling joists such as walls, roofs or other equivalent structures. Lag screws or other fastening elements such as nails, rivets or other equivalent fastening elements are inserted into some or all of elongated slots which are formed in the support rails. Each of the support rails have a plurality of elongated slots, a base portion and rails which are shaped to form grooves along the sides of the support rail. The rails have a curved portion which form the grooves so at least one support rail connector can be inserted into the grooves of the support rail. Therefore, in order for the storage system to accommodate additional containers (i.e. storage containers), the support rails can be connected to one another with at least one support rail connector. However, if the support rail has sufficient length and/or the storage container(s) has/have a length less than the support rail, a support rail connector may not be inserted into the grooves of the support rail. Additionally, the grooves of the support rail accommodate sliding fastening clips and slide nuts.

The slide nut is fastened to the sliding fastening clip with a bolt. The bolt could be a screw, a rivet or other equivalent fastening element(s).

Semi-circular shaped holes can be formed at one end or at each end of the support rail connector. The holes can have any smooth curved shape which reduces the weight of the support rail connector as well as prevents high stress within the support rail connector. The base portion of the support rail is flat or generally flat shaped.

The channel rails have the general shape of an I-beam. Each channel rail has upper flanges and lower flanges, a web and channels on each side of the web. The web has a web opening at each end of the channel rail. Therefore, each channel rail has two web openings, one web opening at each end of the channel rail. The web opening is symmetrically shaped and is formed in the web of the channel rail. The web opening extends in the range of one inch to three inches along the depth direction of the channel rail. The depth direction range of one inch to three inches can be shorter or longer depending on the storage weight and length of the storage system. For example, the web opening in the web could extend half an inch or five inches in the depth direction of the channel rail. The web opening is comprised of elongated openings, which are perpendicular to the upper flanges and the lower flanges of the channel rail, and has a circular or rounded opening located between the elongated openings. The web of the channel rail can be formed to have a hollow interior along the entire depth direction of the channel rail or along a portion of the depth direction of the channel rail, where one support device or a plurality of support devices are spaced at regular or differing spacings within the hollow interior of the web.

In order for the storage system to accommodate additional containers, the channel rails can be connected to one another with at least one support channel connector. The support channel connector is inserted into one or both web openings of the web in order connect the channel rails together and enlarge the size of the storage system. However, if the channel rail has sufficient length and/or the storage container(s) has/have a length less than the channel rail, the support channel connector may not be inserted into the web opening of the channel rail.

The support channel connector has an aperture at one end or at each end of the support channel connector. On one side (i.e. a first side) of the support channel connector, an elongated protrusion extends from a flat surface of the support channel connector. The other side (i.e. a second side) of the support channel connector has a cavity having the same size (i.e. length and width) of the elongated protrusion and the cavity is formed in the middle of the flat surface, located directly underneath the elongated protrusion.

The sliding fastening clip has a hole and an abutment portion. The abutment portion contacts a side of one of the upper flanges of the channel rail. Part or a portion of the abutment portion can have the same shape as the shape of the side of one of the upper flanges in order to provide a tight and secure mating/connection/contact between the part or a portion of the abutment portion and the side of one of the upper flanges. Due to the position/location of the abutment portion, an end portion of the sliding fastening clip is spaced (i.e. has a spacing) a distance from the web of the channel rail. The spacing can be in the range of 1/16" to 1/2". However, the spacing can be smaller than 1/16" or larger than 1/2" depending on the size of the sliding fastening clip and/or slide nut. The sliding fastening clip has a rectangular shape with smooth curved shaped corners but can be any geometrical shape or polygonal shape which functions to connect together the channel rail and the support rail.

The slide nut has a threaded hole, rounded/curved corners, linear shaped sides and linear shaped ends. The slide nut has a rectangular shape but can be any geometrical shape or polygonal shape which functions to connect together the channel rail and the support rail. The slide nut has a length slightly smaller (i.e. slightly smaller can include 0.1 mm up to 5 mm) than the width of the support rail because the slide nut is installed within the support rail such that the corners and the linear shaped ends of the slide nut are located underneath the curved portion and within the grooves of the support rail 101. In order to secure the channel rail and the support rail together with the sliding fastening clip, once the sliding fastening clip and slide nut are within the support rail, the bolt is inserted into the hole of the sliding fastening clip and then the bolt is threaded into the threaded hole of slide nut and then the bolt is tightened in order to tightly bring together the inside surface of one of the upper flanges with a surface of the sliding fastening clip.

In order move the channel rail along the length of the support rail to obtain the desired distance between each pair of adjacent channel rails, one simply loosens the bolt which no longer brings together the inside surface of one of the upper flanges with a surface of the sliding fastening clip and one simple moves the channel rail along the support rail to obtain a desired distance between adjacent channel rails in order to accommodate the different widths of the storage containers The bolts are then tightened after the channel rail(s) have moved along the support rail(s) to the desired location in order to secure each channel rail and support rail together. At least two sliding fastening clips are installed in each of the connected support rails.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without inventive effort. Therefore, the embodiments, drawings and detailed disclosure do not limit the scope of the invention but rather provide a clear disclosure of the disclosed invention.

Figure 1:
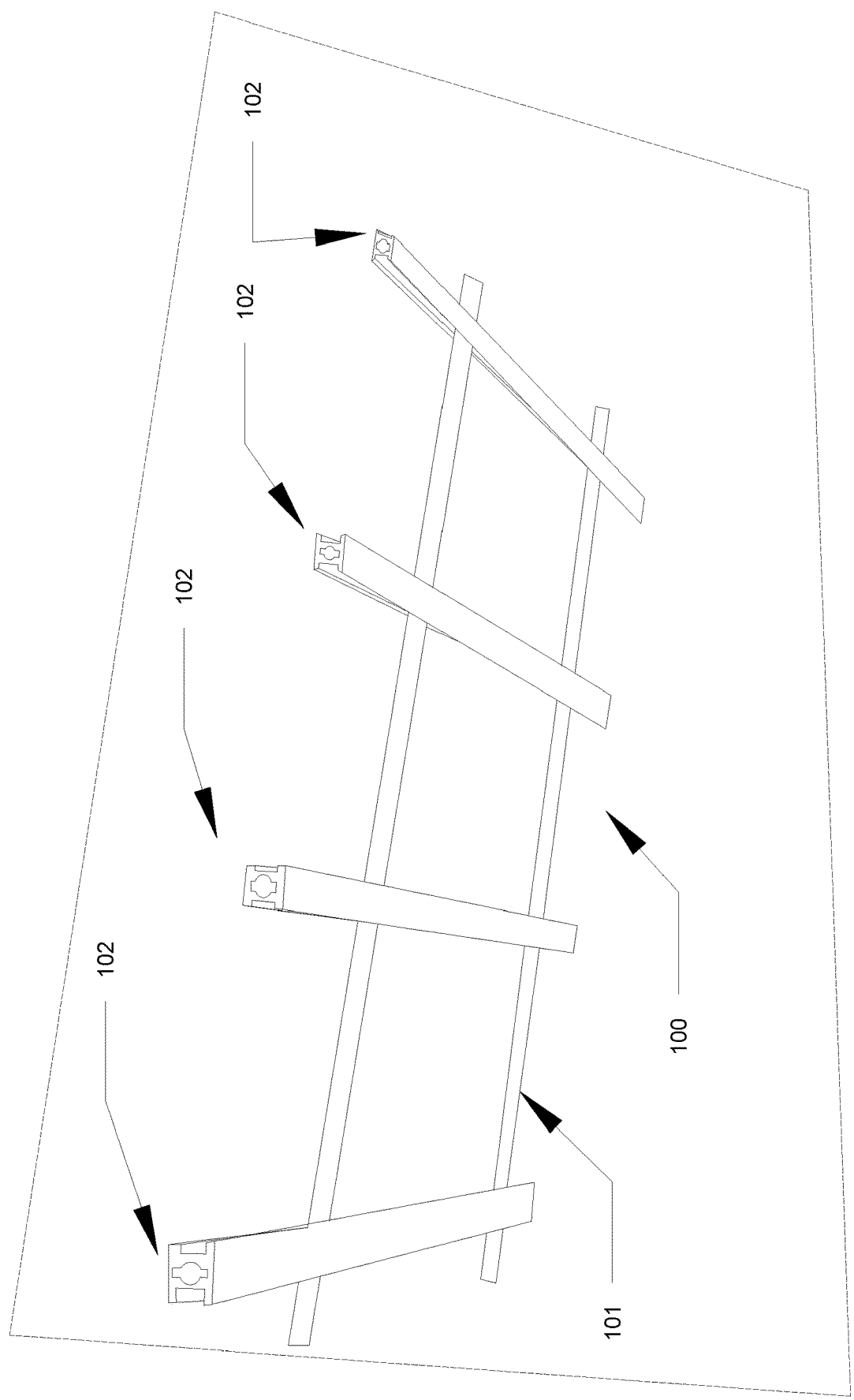
FIG. 1 is a schematic structural view of a storage system installed on a ceiling.

Reference numbers: 1—container; 100—storage system; 101—support rail; 102—channel rail; 103—slide fastening clip; 104—ceiling joist; 106—lag screw; 107—support rail connector; 108—elongated slots; 109—groove; 110—rails; 111—base portion; 112—curved portion; 113—hole; 114—slide nut; 115—bolt; 116—upper flanges; 117—lower flanges; 118—web; 119—channel; 120—web opening; 121—elongated opening; 122—circular or round opening; 123—support channel connector; 124—aperture; 125—flat surface; 126—elongated protrusion; 127—hole; 128—abutment portion; 129—threaded hole; 130—rounded/curved corner; 131—linear shaped side; 132—linear shaped end; 133—end portion; 134—a side; 135—spacing, 136—an inside surface.

DETAILED DESCRIPTION

The technical solutions of the present disclosure will be clearly and completely described below with reference to the drawings. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link" and "connect" shall be understood in the broadest sense, which may, for example, refer to fixed connection, detachable connection or integral connection;

may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

The present disclosure of the storage system 100 is described in detail below in reference to the figures.

The apparatus, elements, structural devices and components of the storage system may be fabricated from any suitable material including, but not limited to, alloys, metals, steel, aluminum, composites, wood or plastic(s). Also, the apparatus, elements, structural devices and components of the storage system may be fabricated using any suitable technique including, but not limited to, stamping, forging, molding, machining, additive processes, or welding.

FIGS. 1-17 illustrate the present invention of a storage system 100.

FIG. 1 illustrates the storage system 100 installed on a ceiling.

The storage system 100 includes a plurality of support rails 101, a plurality of channel rails 102, at least four sliding fastening clips 103 and fastening elements.

Figure 2:
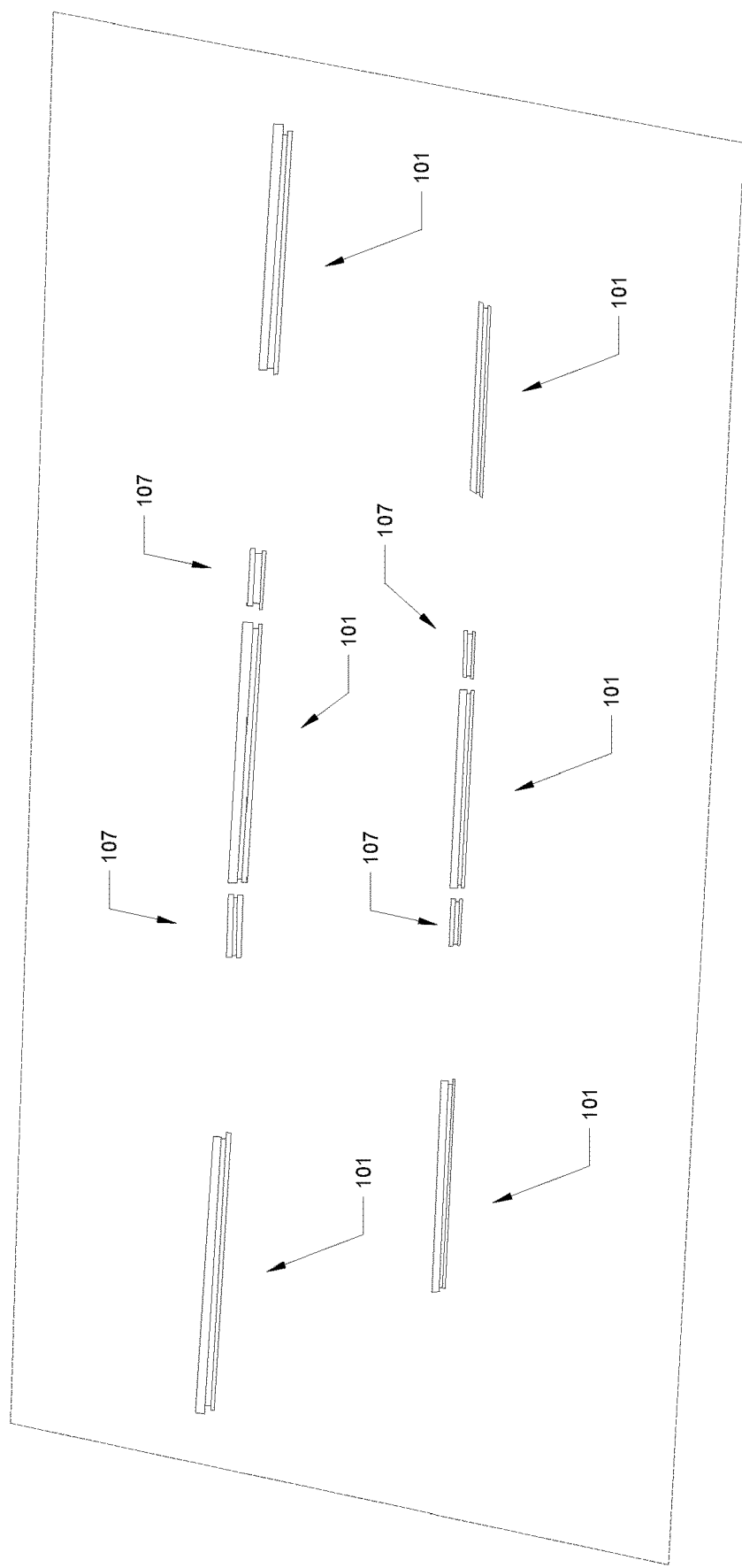
FIG. 2 is a schematic view of the structural diagram of the support rail connectors and the support rails installed on the ceiling.
Figure 4:
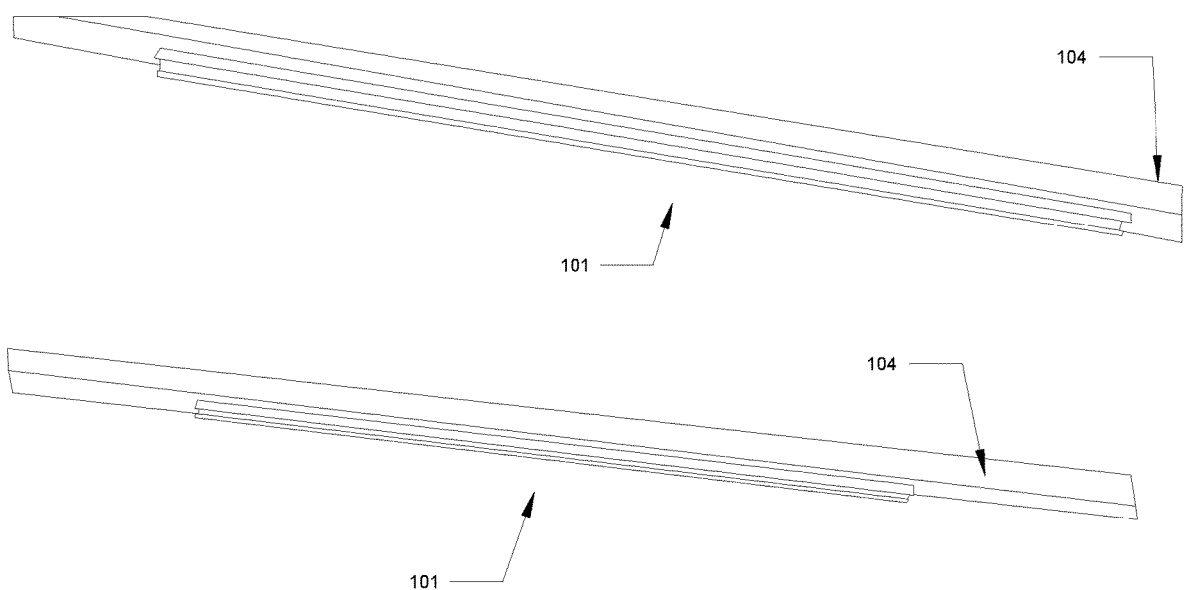
FIG. 4 is a schematic view of the support rails installed along the ceiling joists.
Figure 5:
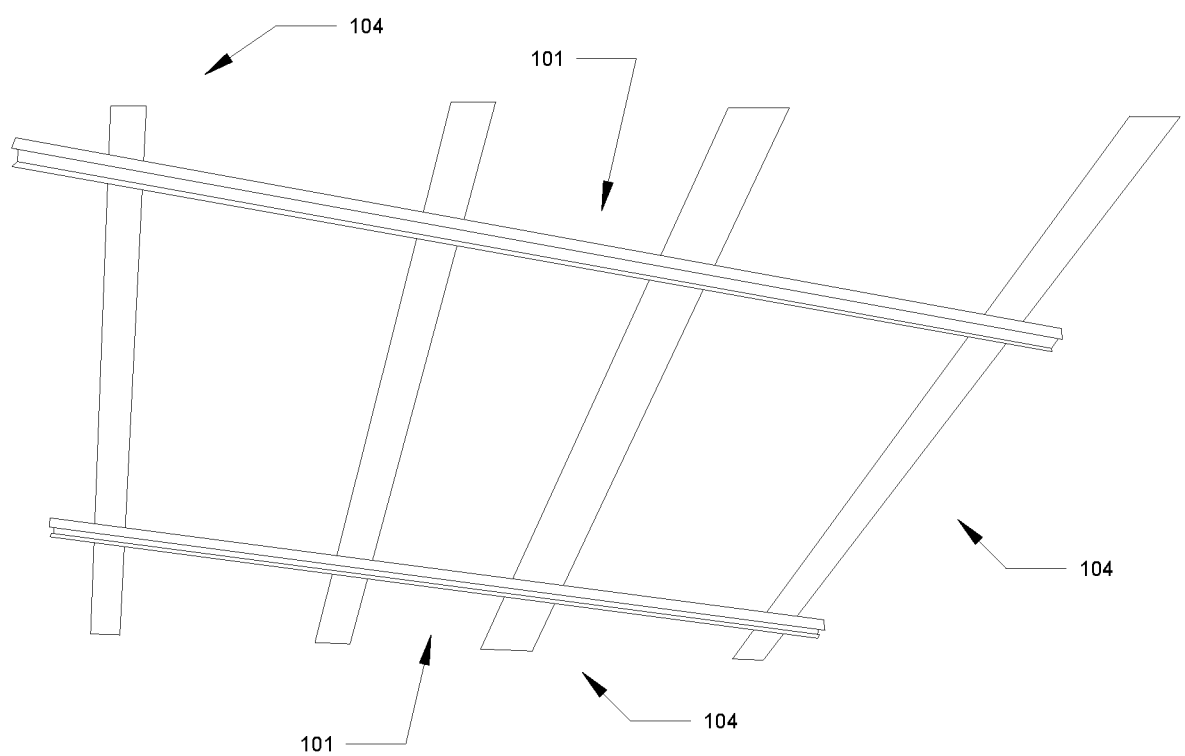
FIG. 5 is a schematic view of the support rails installed across the ceiling joists.
Figure 6:
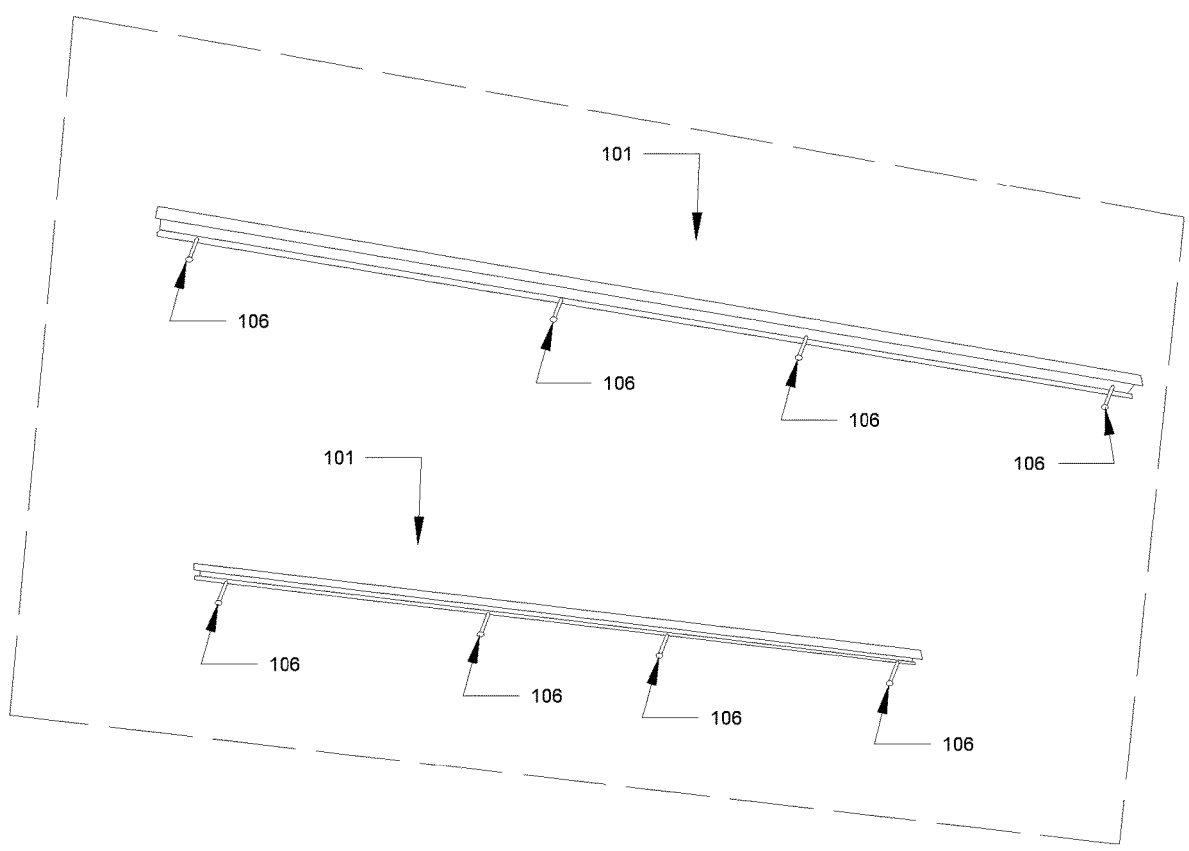
FIG. 6 is a schematic view of lag screws connecting the support rails to the ceiling.
Figure 7:
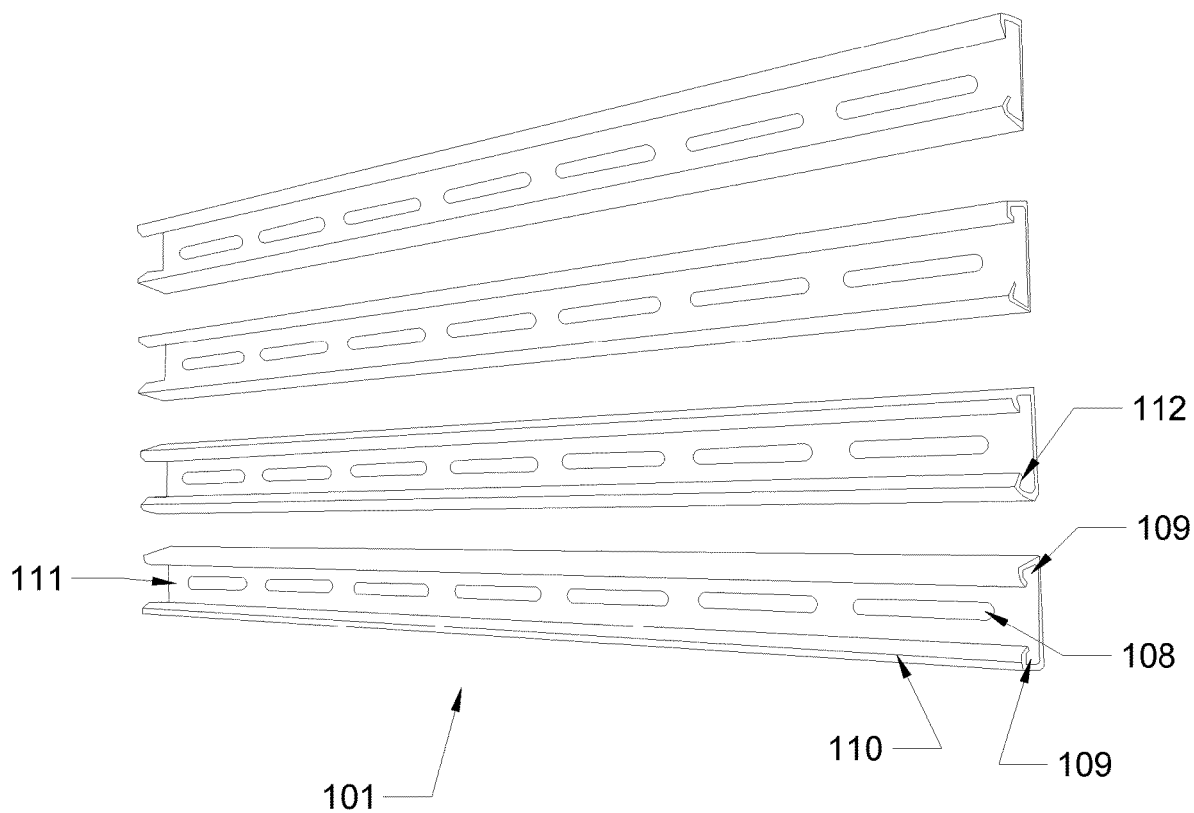
FIG. 7 is a detailed perspective view of the support rails.
Figure 11:
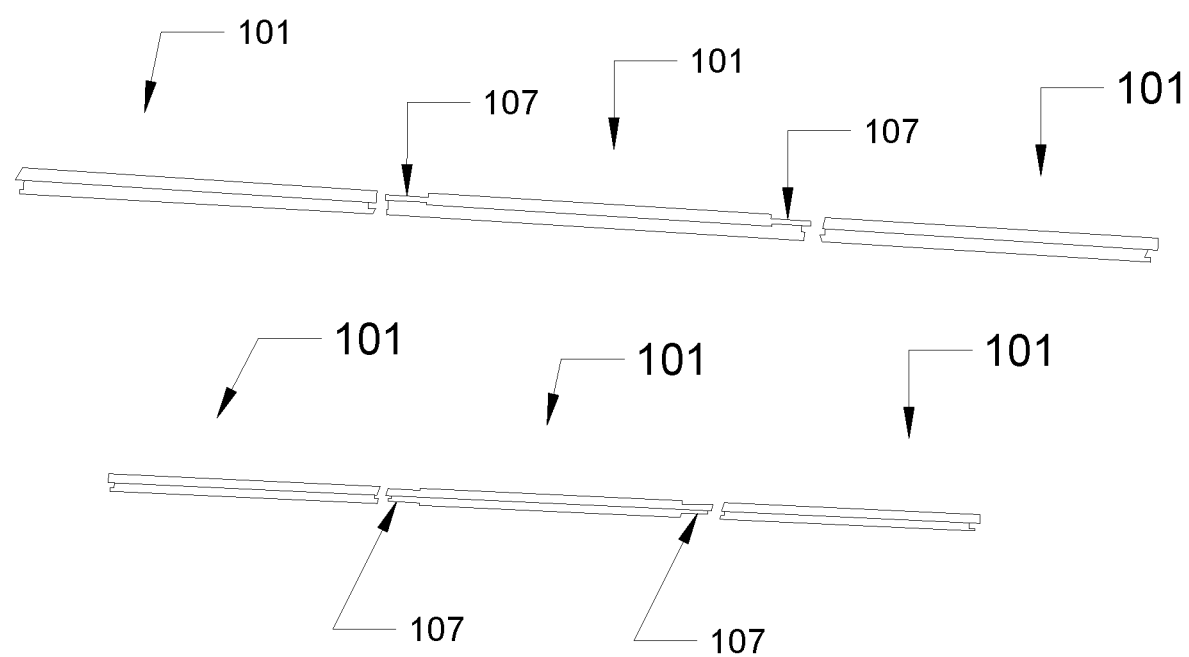
FIG. 11 is a schematic view of the support rail connectors installed in the support rails.

The support rails 101 are installed along the ceiling joists 104 as shown in FIG. 4 or the support rails 101 are installed across the ceiling joists 104 as shown in FIG. 5. The support rails 101 can be installed on other surfaces other than ceiling joists 104 such as walls, roofs or other equivalent structures. Lag screws 106 or other fastening elements such as nails, rivets or other equivalent fastening elements are inserted into some or all of the elongated slots 108 of the support rail 101 as shown in FIG. 6 and FIG. 7. As shown in FIG. 7, each of the support rails 101 have a plurality of elongated slots 108, a base portion 111 and rails 110 which are shaped to form grooves 109 along the sides of the support rail 101. The rails 110 have a curved portion 112 which form the grooves 109 so at least one support rail connector 107 as show in FIG. 2 and in FIG. 9 can be inserted into the grooves 109 of the support rail 101 as shown in FIG. 11. Therefore, in order for the storage system 100 to accommodate additional containers 1 (i.e. storage containers), the support rails 101 can be connected to one another as shown in FIG. 2, FIG. 11 and FIG. 14 with at least one support rail connector 107, as shown in FIG. 7. However, if the support rail 101 has sufficient length and/or the storage container(s) has/have a length less than the support rail 101, a support rail connector 107 may not be inserted into the grooves 109 of the support rail 101. Additionally, the grooves 109 of the support rail 101 accommodate the sliding fastening clips 103 and the slide nuts 114 as shown in FIG. 12, FIG. 13 and FIG. 14.

Figure 12:
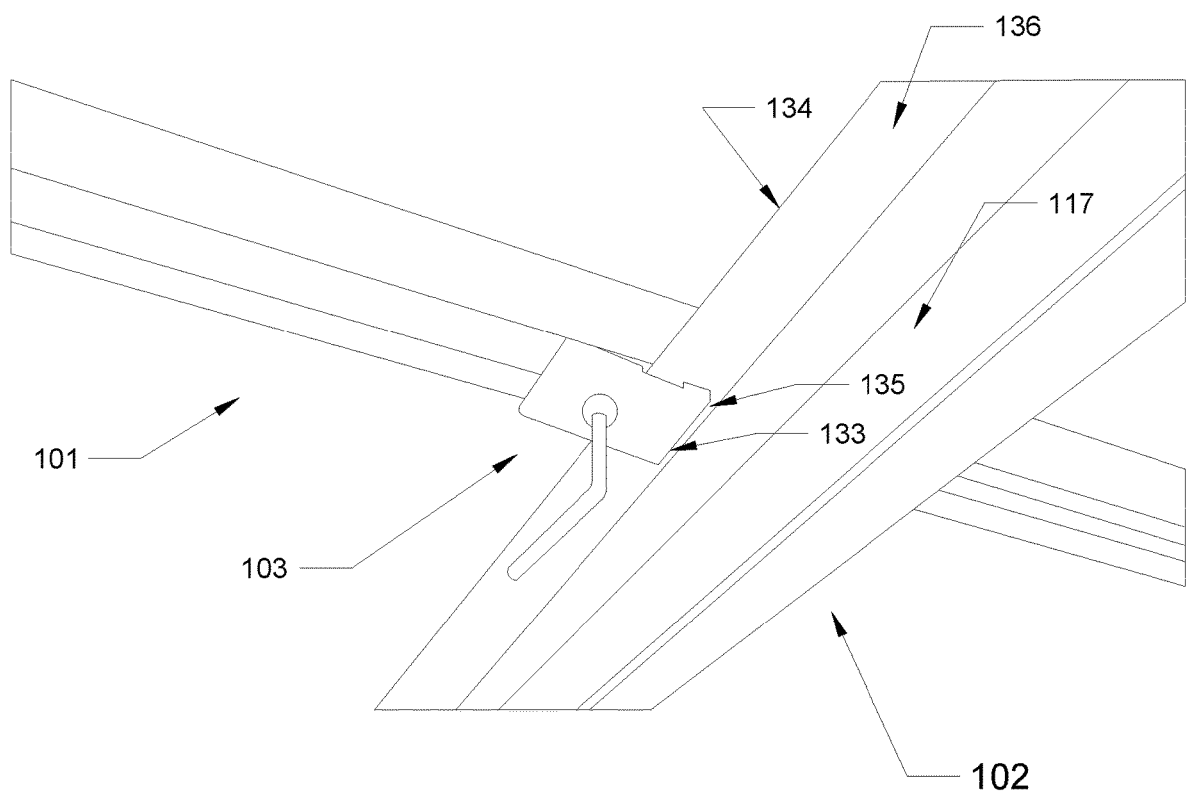
FIG. 12 is a schematic view of the support rail connector and the channel rail being connected together with the sliding fastening clip.
Figure 13:
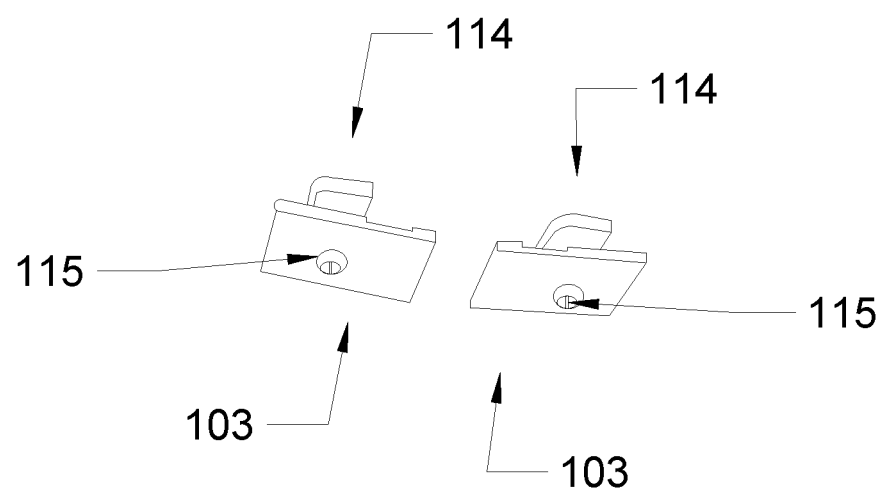
FIG. 13 is a schematic view of the bolt connecting the sliding fastening clip and the slide nut together.
Figure 14:
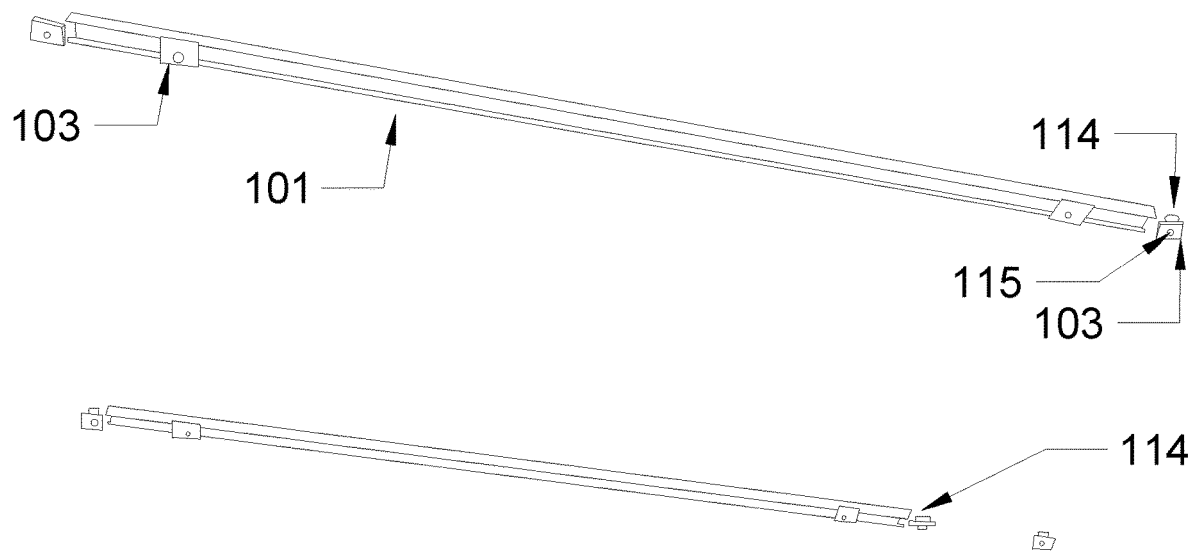
FIG. 14 is a schematic view of the slide nut connected to the sliding fastening clip and the slide nuts inserted into the support rails.

As shown in FIG. 12, FIG. 13 and FIG. 14, the slide nut 114 is fastened to the sliding fastening clip 103 with a bolt 115. The bolt 115 could be a screw, a rivet or other equivalent fastening element(s).

Figure 9:
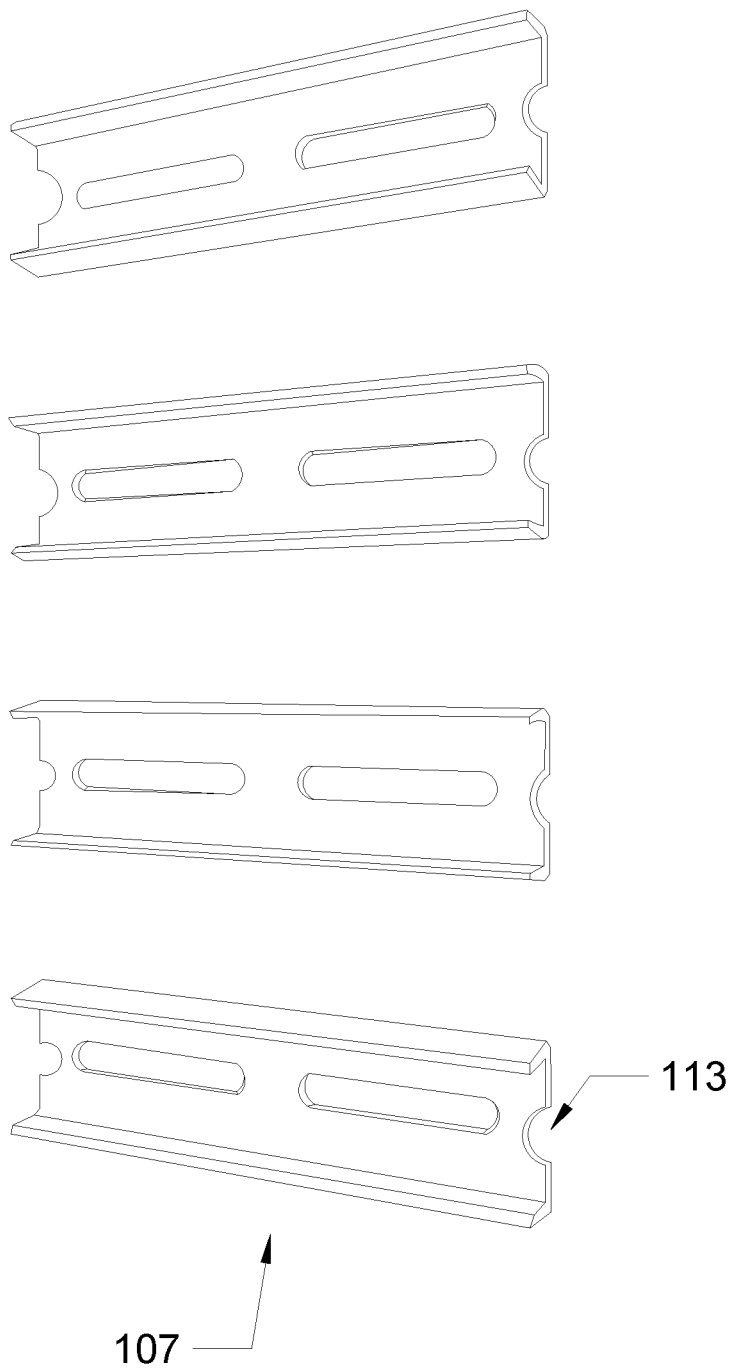
FIG. 9 is a detailed perspective view of the support rail connectors.

Semi-circular shaped holes 113 can be formed at one end or at each end of the support rail connector 107 as shown in FIG. 9. The holes 113 can have any smooth curved shape which reduces the weight of the support rail connector 107 as well as prevents high stress within the support rail connector 107. The base portion 111 of the support rail 101 is flat or generally flat shaped.

Figure 8:
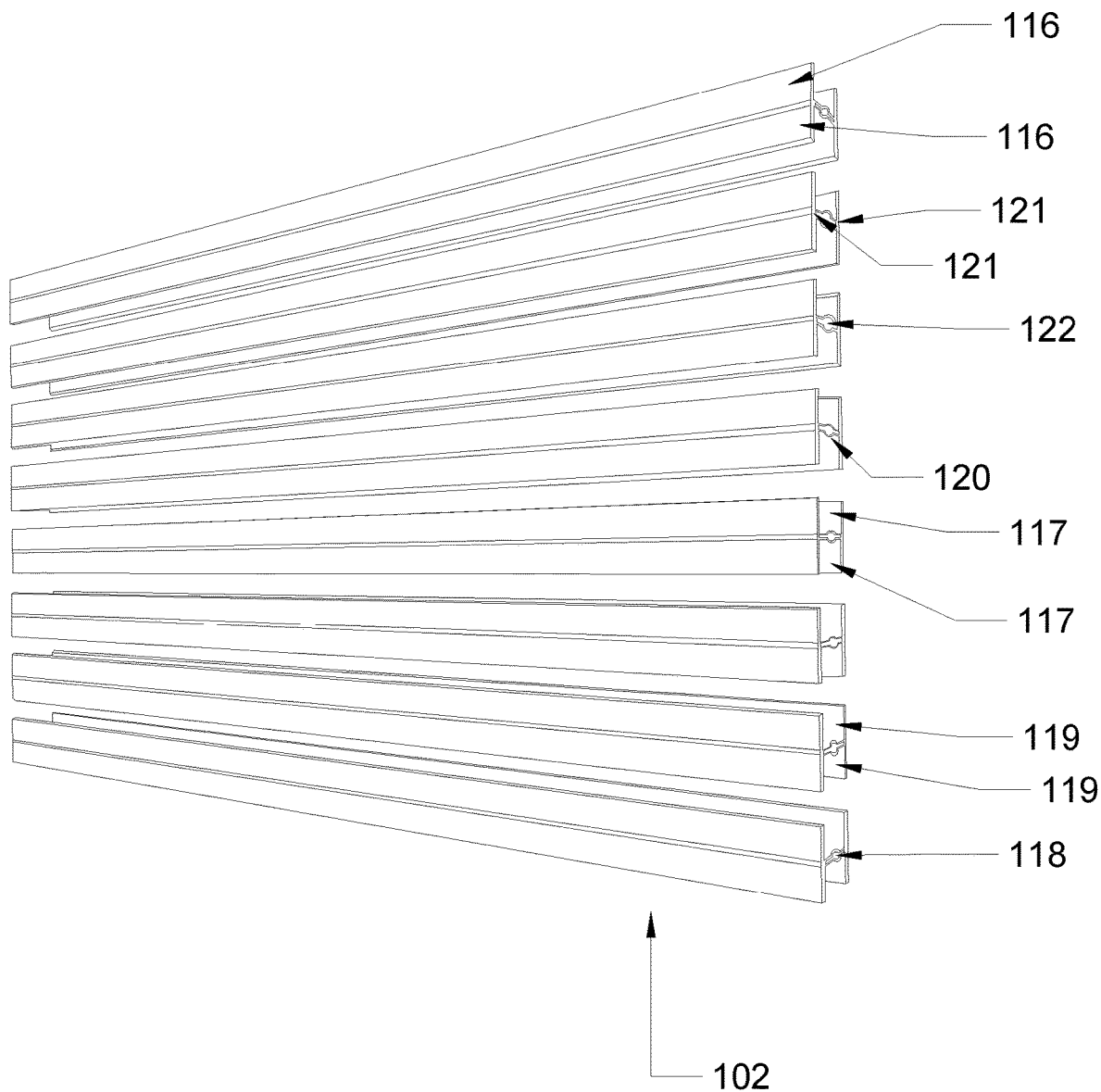
FIG. 8 is a detailed perspective view of the channel rails.

The channel rails 102 have the general shape of an I-beam as shown in FIG. 8. Each channel rail has upper flanges 116 and lower flanges 117, a web 118 and channels 119 on each side of the web 118 as shown in FIG. 8. The web 118 has a web opening 120 at each end of the channel rail 102. Therefore, each channel rail 102 has two web openings 120, one web opening 120 at each end of the channel rail 102. The web opening 120 is symmetrically shaped and is formed in the web 118 of the channel rail 102. The web opening 120 extends in the range of one inch to three inches along the depth direction of the channel rail 102 as shown in FIG. 8. In FIG. 8, the depth direction is considered to be the y-axis direction in the standard x-y plane of FIG. 8. The above depth direction range of one inch to three inches can be shorter or longer depending on the storage weight and length of the storage system 100. For example, the web opening 120 in the web 118 could extend half an inch or five inches in the depth direction of the channel rail 102. The web opening 120 is comprised of elongated openings 121, which are perpendicular to the upper flanges 116 and the lower flanges 117 of the channel rail 102, and has a circular or rounded opening 122 located between the elongated openings 121. The web 118 of the channel rail 102 can be formed to have a hollow interior along the entire depth direction of the channel rail 102 or along a portion of the depth direction of the channel rail 102, where one support device or a plurality of support devices are spaced at regular or differing spacings within the hollow interior of the web 118.

Figure 3:
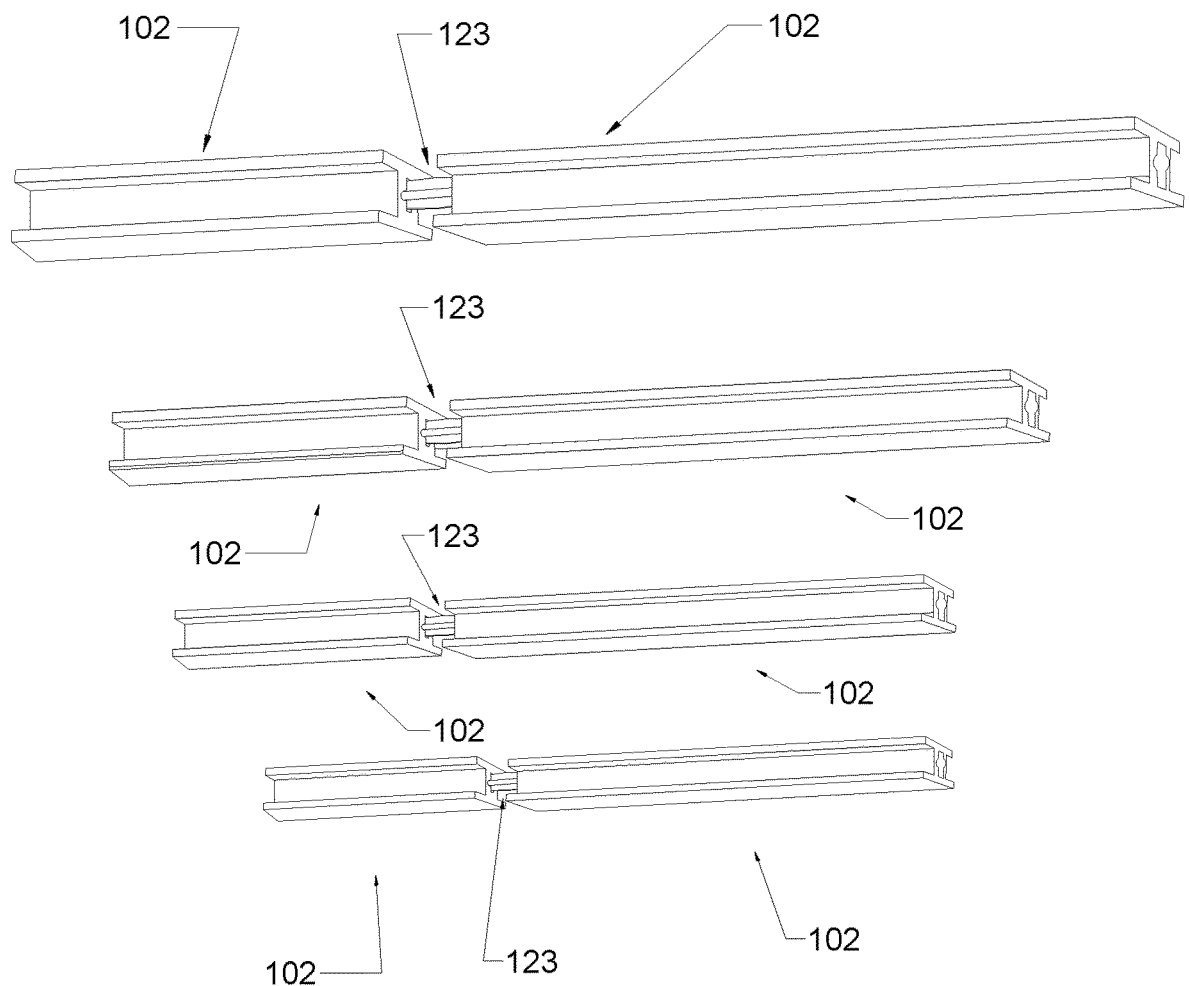
FIG. 3 is a schematic view of the channel rails being connected to one another with the support channel connectors.
Figure 10:
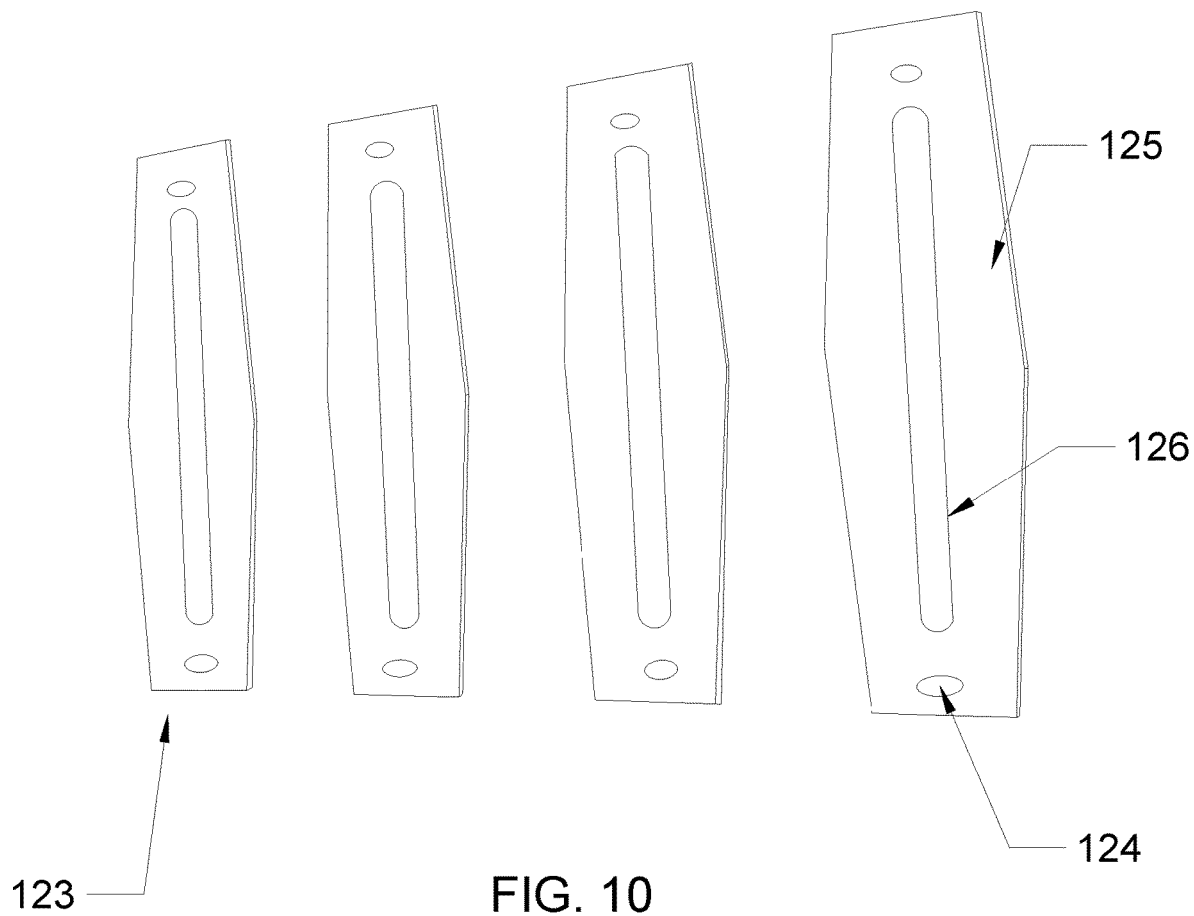
FIG. 10 is a detailed perspective view of the support channel connectors.

In order for the storage system to accommodate additional containers, the channel rails 102 can be connected to one another as shown in FIG. 3 with at least one support channel connector 123 as shown in FIG. 10. The support channel connector 123 is inserted into one or both web openings 120 of the web 118 in order connect the channel rails 102 together and enlarge the size of the storage system 100. However, if the channel rail 102 has sufficient length and/or the storage container(s) has/have a length less than the channel rail 102, the support channel connector 123 may not be inserted into the web opening 120 of the channel rail 102.

As shown in FIG. 10, the support channel connector 123 has an aperture 124 at one end or at each end of the support channel connector 123. On one side (i.e. a first side) of the support channel connector 123, an elongated protrusion 126 extends from a flat surface 125 of the support channel connector 123. The other side (i.e. a second side) of the support channel connector 123, has a cavity having the same size (i.e. length and width) of the elongated protrusion 126 and the cavity is formed in the middle of the flat surface 125, located directly underneath the elongated protrusion 126.

Figure 15:
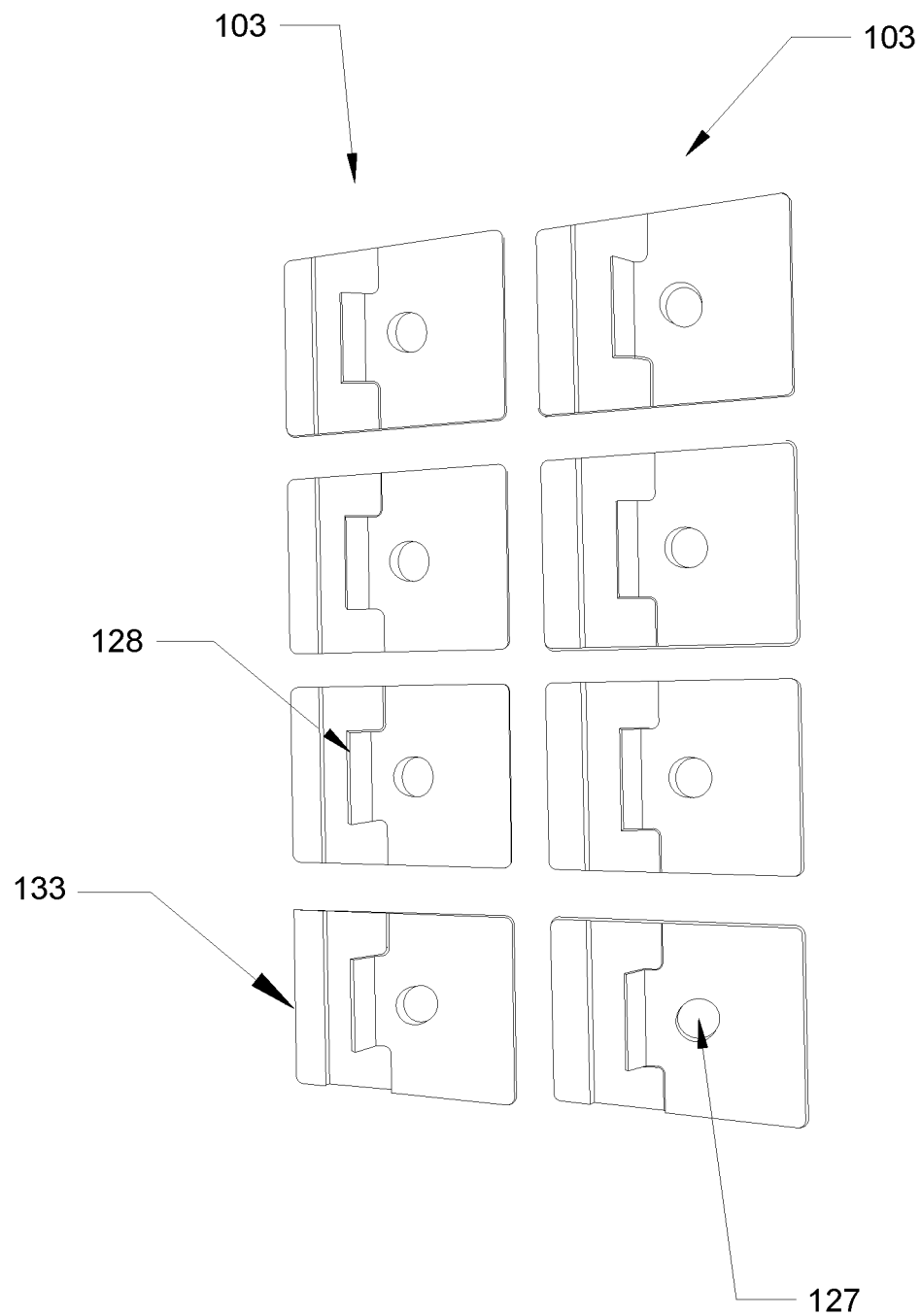
FIG. 15 is a detailed perspective view of the sliding fastening clips.

As shown in FIG. 15, the sliding fastening clip 103 has a hole 127 and an abutment portion 128. The abutment portion 128 contacts a side 134 of one of the upper flanges 116 of the channel rail 102 as shown in FIG. 12. Part or a portion of the abutment portion 128 can have the same shape as the shape of the side 134 of one of the upper flanges 116 in order to provide a tight and secure mating/connection/contact between the part or a portion of the abutment portion 128 and the side 134 of one of the upper flanges 116. Due to the position/location of the abutment portion 128, an end portion 133 of the sliding fastening clip 103 is spaced (i.e. has a spacing 135) a distance from the web 118 of the channel rail 102 as shown in FIG. 12. The spacing 135 can be in the range of 1/16" to 1/2". However, the spacing 135 can be smaller than 1/16" or larger than 1/2" depending on the size of the sliding fastening clip 103 and/or slide nut 114. The sliding fastening clip 103 has a rectangular shape with smooth curved shaped corners but can be any geometrical shape or polygonal shape which functions to connect together the channel rail 102 and the support rail 101.

Figure 16:
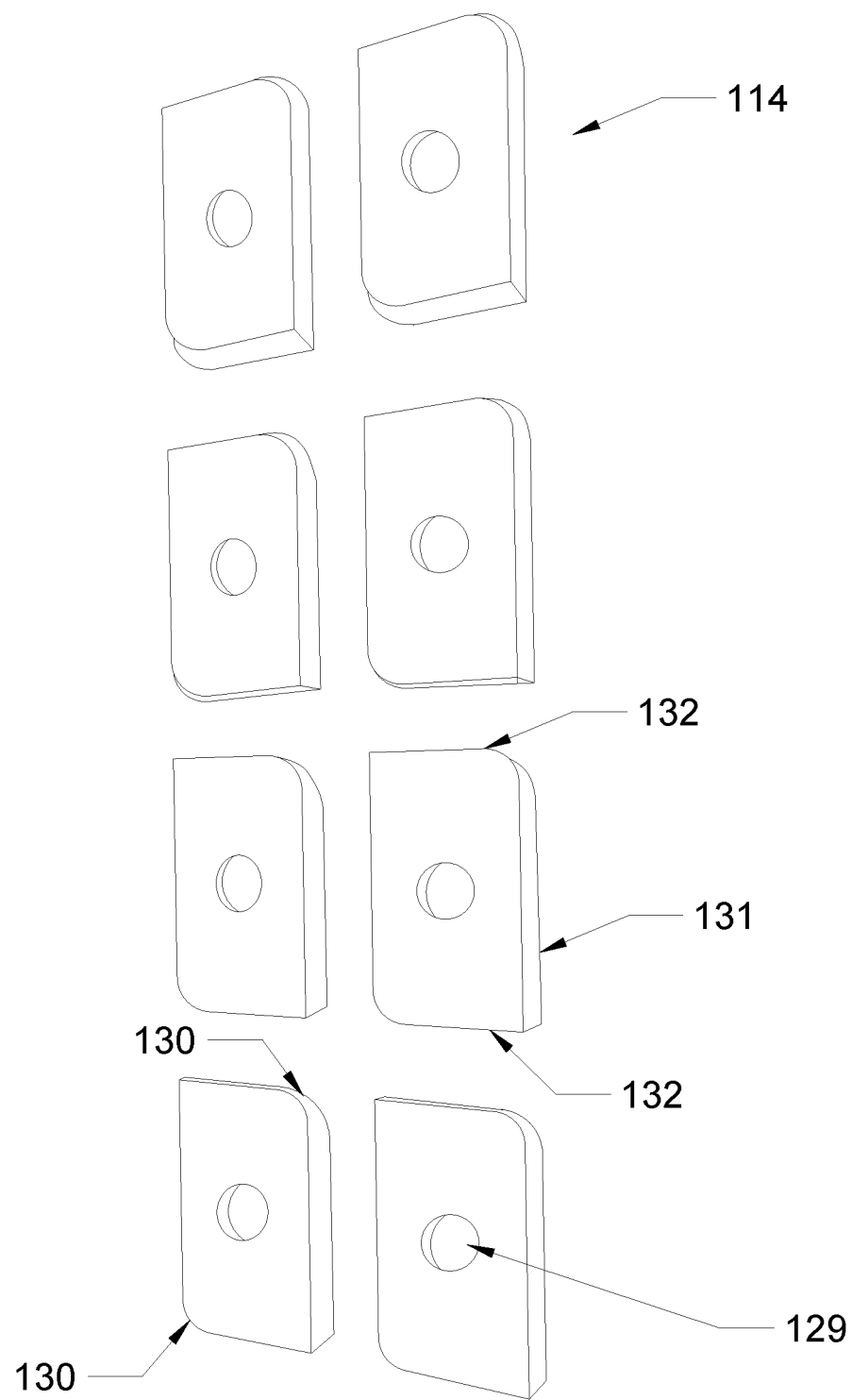
FIG. 16 is a detailed perspective view of the slide nuts.
Figure 17:
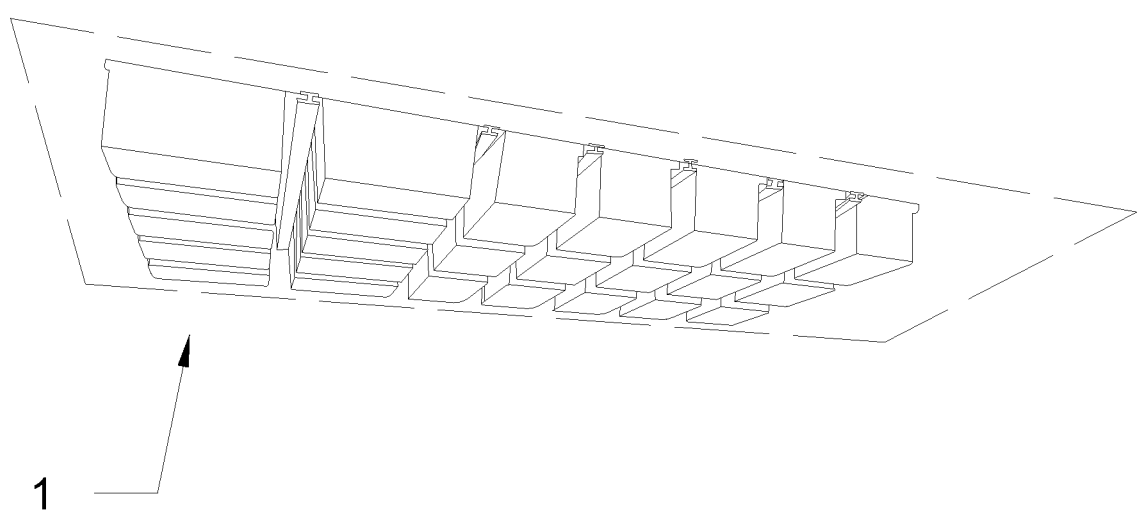
FIG. 17 is a schematic view illustrating storage container located in the storage system where the channel rails have differing distances between the pairs of channel rails in order to accommodate the different widths of the storage containers.

As shown in FIG. 16, the slide nut 114 has a threaded hole 129, rounded/curved corners 130, linear shaped sides 131 and linear shaped ends 132. The slide nut 114 has a rectangular shape but can be any geometrical shape or polygonal shape which functions to connect together the channel rail 102 and the support rail 101. The slide nut 114 has a length slightly smaller (i.e. slightly smaller can include 0.1 mm up to 5 mm) than the width of the support rail 101 because the slide nut 114 is installed within the support rail 101 as shown in FIG. 12 and FIG. 14 such that the corners 130 and the linear shaped ends 132 of the slide nut 114 are located underneath the curved portion 112 and within the grooves 109 of the support rail 101. In order to secure the channel rail 102 and the support rail 101 together with the sliding fastening clip 103 as shown in FIG. 12, once the sliding fastening clip 103 and slide nut 114 are within the support rail 101, the bolt 115 is inserted into the hole 127 of the sliding fastening clip 103 and then the bolt is threaded into the threaded hole 129 of slide nut 114 and then the bolt is tightened in order to tightly bring together the inside surface 136 of one of the upper flanges 116 with a surface of the sliding fastening clip 103 as shown in FIG. 12. In order move the channel rail 102 along the length of the support rail 101 to obtain the desired distance between each pair of adjacent channel rails 102 as shown in FIG. 17, one simply loosens the bolt 115 which no longer brings together the inside surface 136 of one of the upper flanges 116 with a surface of the sliding fastening clip 103 and one simple moves the channel rail 102 along the support rail 101 to obtain a desired distance between adjacent channel rails 102 in order to accommodate the different widths of the containers 1. The bolts 115 are then tightened after the channel rail(s) 102 have moved along the support rail(s) 101 to the desired location in order to secure each channel rail 102 and support rail 101 together. At least two sliding fastening clips 103 are installed in each of the connected support rails 101 as shown in FIG. 14.

Finally, it should be noted that the above embodiments are only used to illustrate the technical aspects of the present disclosure, rather than limit the embodiments. Although the present disclosure has been described in detail with reference to the foregoing embodiments, it should be understood by a person of ordinary skill in the art that the technical aspects described in the embodiments can still be modified or equivalent substitutions can be made to some or all of the technical features and the modifications or substitutions would not change the substance of the scope of the embodiments of the present disclosure.

What is claimed is:

1. A storage system comprising:
a plurality of support rails,
a plurality of channel rails connected to the plurality of support rails,
at least four sliding fastening clips and at least four slide nuts accommodated in the plurality of support rails,
at least four bolts for fastening the at least four slide nuts to the at least four sliding fastening clips, wherein
each of the plurality of channel rails comprise upper flanges, lower flanges, a web, and
a web opening at each end of the plurality of channel rails, wherein each web opening comprises elongated openings perpendicular to the upper flanges and the lower flanges of the plurality of channel rails and a circular or rounded opening located between the elongated openings.

2. The storage system according to claim 1, wherein at least one of the plurality of channel rails is moveable along a length of at least one of the plurality of support rails.

3. The storage system according to claim 1, wherein each side of the web has channels.

4. The storage system according to claim 1, wherein each web opening is symmetrically shaped.

5. The storage system according to claim 1, wherein a support channel connector is inserted into at least one of the web openings.

6. The storage system according to claim 5, wherein the support channel connector has an elongated protrusion.

7. The storage system according to claim 1, wherein each of the plurality of support rails have a plurality of elongated slots, a base portion and rails.

8. The storage system according to claim 7, wherein the rails form grooves along sides of each of the plurality of support rails.

9. The storage system according to claim 7, wherein the rails comprise curved portions which form grooves along sides of each of the plurality of support rails.

10. The storage system according to claim 1, wherein each sliding fastening clip connects one of the plurality of support rails with one of the plurality of channel rails.

11. The storage system according to claim 10, wherein each sliding fastening clip has a hole and an abutment portion.

12. The storage system according to claim 11, wherein the abutment portion contacts a side of one of the upper flanges of a channel rail of the plurality of channel rails.

13. The storage system according to claim 1, wherein an end portion of the sliding fastening clip is spaced a distance from the web of one of the plurality of channel rails.

14. The storage system according to claim 11, wherein each of the slide nuts of the at least four slide nuts is attached to each of the sliding fastening clips.

15. The storage system according to claim 14, wherein a bolt of the at least four bolts is inserted into the hole of the sliding fastening clip.

16. The storage system according to claim 14, the slide nut is rectangular shaped.

17. The storage system according to claim 1, wherein at least one support rail connector is connected to one of the plurality of support rails.

18. The storage system according to claim 1, wherein a slide nut of the at least four slide nuts has a threaded hole, curved corners, liner shaped sides and linear shaped ends, the slide nut has a rectangular shape to connect each of the plurality of channel rails and each of the plurality of support rails together, the slide nut has a length smaller than a width of each of the plurality of support rails to install the slide nut within each of the plurality of support rails for the curved corners and the linear shaped ends of the slide nut to be located underneath a curved portion and within grooves of each of the plurality of support rails.

19. The storage system according to claim 1, wherein a sliding fastening clip of the at least four sliding fastening clips has a hole and an abutment portion, the abutment portion contacts a side of one of the upper flanges of each of the plurality of channel rails, a portion of the abutment portion has an identical shape as a shape of the side of the one of the upper flanges to provide a secure connection between the portion of the abutment portion and the side of the one of the upper flanges, an end portion of the sliding fastening clip has a spacing, wherein the spacing is a distance from the web of each of the plurality of channel rails, the spacing is provided in a range of $\frac{1}{16}$ inch to $\frac{1}{2}$ inch, the sliding fastening clip has a rectangular shape with curved shaped corners to connect each of the plurality of channel rails and each of the plurality of support rails together.

* * * * *